Sept. 9, 1958 C. J. GLOWZINSKI 2,851,585
ILLUMINATED ASH TRAY
Filed Nov. 26, 1954
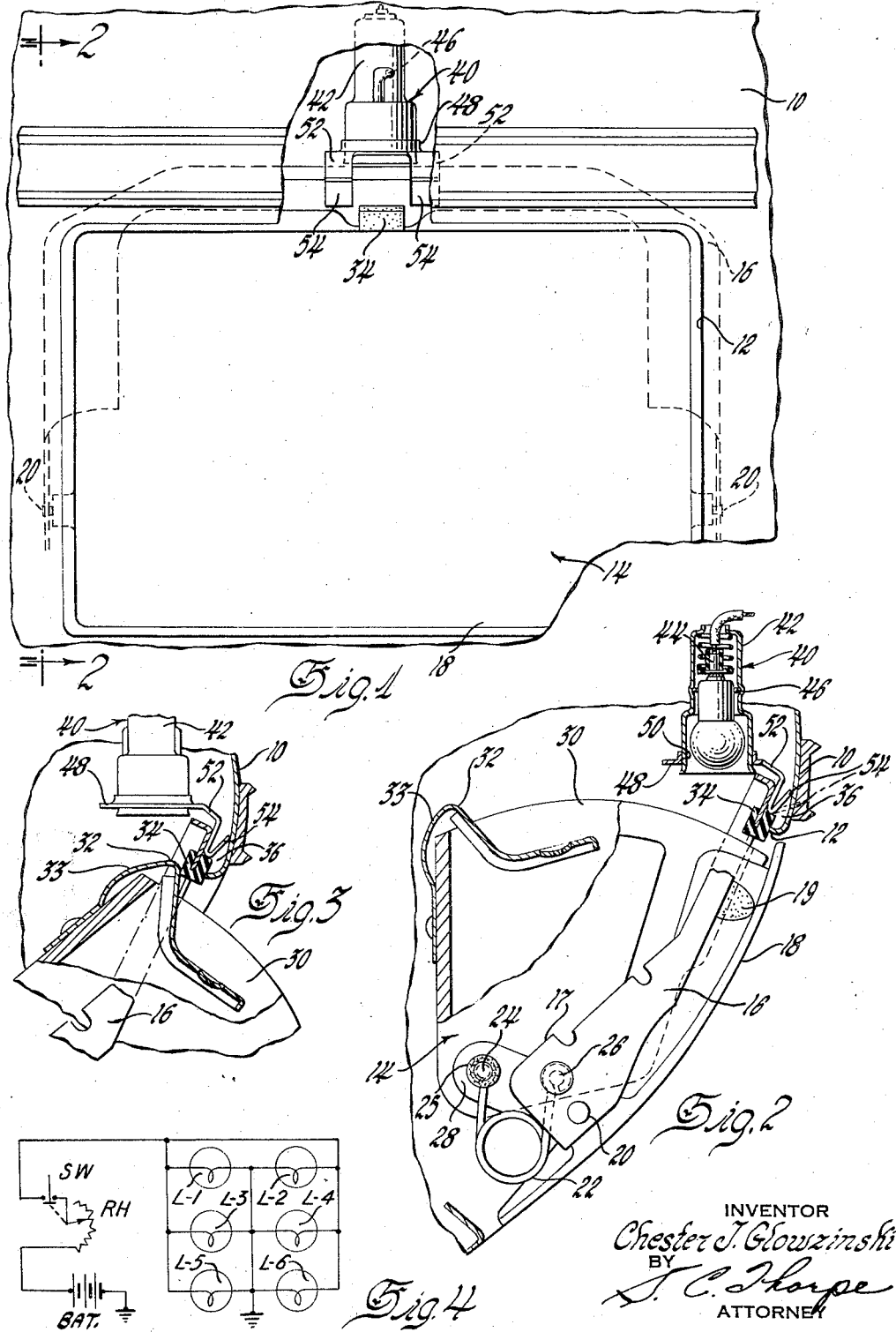
INVENTOR
Chester J. Glowzinski
BY
J. C. Thorpe
ATTORNEY

United States Patent Office 2,851,585
Patented Sept. 9, 1958

2,851,585
ILLUMINATED ASH TRAY

Chester J. Glowzinski, Dearborn, Mich., assignor to General Motors Corporation, Detroit, Mich., a corporation of Delaware Application November 26, 1954, Serial No. 471,199

5 Claims. (Cl. 240—2)

This invention relates to ash receptacles and more specifically to means for lighting closable ash tray constructions.

Automobiles are normally equipped with one or more ash receptacles which are movable between opened and closed positions. During night driving of such vehicles, it has been found that it is difficult to locate such ash receptacles to properly deposit ashes and other disposable incidents of smoking. Quite often the material desired to be deposited in these receptacles will fall free of the ash receptacle onto the floor of the vehicle, the clothes of the occupants, and is free to be blown about by air currents circulating through the car and constituting both a nuisance and a fire hazard.

It is the object of the present invention to provide means for illuminating the ash receptacle whereby the ash receptacle may be easily seen and easily located during darkness, whether in its opened or closed position, and it is a further purpose of this invention to provide means for so illuminating the ash tray so that such illumination will not impair the night vision of the occupants of the vehicle thereby constituting a driving hazard.

Further and more specific objects of this invention are to provide such illumination by means of an accessory lamp which may be installed in existing vehicle ash tray constructions and to utilize a combined snuffer and stop member associated with the ash receptacle as a shield preventing the direct illumination of the receptacle when in its opened position.

These and other objects and advantages of the invention will be more fully understood from the following description of the accompanying drawing showing a preferred embodiment of the invention, in which:

Figure 1 is a fragmentary view of a portion of a vehicle instrument panel housing an ash tray with portions thereof broken away to show the mounting of the ash tray illuminating light behind the instrument panel;

Figure 2 is a view of the instrument panel and ash tray construction taken substantially in the direction of the arrows 2—2 of Figure 1 with portions thereof broken away and in section;

Figure 3 is a fragmentary view similar to Figure 2 but showing the ash receptacle in its opened position; and Figure 4 is a simple schematic showing the instrument lighting portion of a motor vehicle lighting circuit.

Referring now to the details of construction as shown in the drawing, the supporting structure for the ash tray includes a portion of an instrument panel 10 which is provided with an opening 12 therein for the accommodation of the ash tray assembly 14. A yoke-shaped supporting frame or retainer is mounted behind the instrument panel 10 and is secured thereto by any suitable attaching means, not shown. A cover door or panel 18 forms a closure for the opening 12 and is pivotally mounted on the frame 16 as indicated at 20, 20. The cover member 18 is moveable between an opened and a closed position. A resilient bumper 25 mounted on a pin 24, which is carried by a rearwardly extending arm 28 formed on the cover plate 18, contacts the edge 17 of member 16 to limit the opening movement of the member 18, and resilient bumpers 19 mounted on each side of the frame 16 serve to cushion and limit the closing movement of the door 18. An over-center torsional spring 22 interposed between the pin 24 and a pin 26 carried by the frame member 16 serves to maintain the cover member in either of the above-mentioned extreme positions.

An ash receptacle 30 is removably secured to the inner face of the cover member 18 by suitable means, not shown. The receptacle 30 is provided with a snuffer element 32 which is centrally located on the side of the receptacle remote from the cover member 18. A resilient pad 34 carried by the frame member 16 in combination with the snuffer member 32 forms a stop means for limiting the opening of the ash tray assembly to an intermediate position just short of the extreme opened position of the member 18. Upon depression of the combined snuffer and stop member 32 clearing the pad 34, the member 18 can be moved to its extreme opened position in which position the receptacle 30 may be removed for the purpose of cleaning the receptacle.

The upper portion of the opening 12 in the panel 10 is formed with an inwardly extending flange which is in abutment with a forwardly extending portion of the pad 34 and forms a relatively narrow groove 36 between the panel member 10 and the frame member 16. The groove 36 serves to mount an accessory light assembly 40 immediately behind the panel 10 and the frame member 16 and above the ash receptacle 30. This accessory light includes a tubular socket member 42 which is adapted to mount an electric lamp L-6 therein and provides suitable contacts therewith, as indicated at 44, 46 for connecting the lamp with an electrical lighting circuit of the vehicle.

As shown in Figure 4, the light L-6 may be connected in parallel with the other lights L-1 through L-5 of an instrument lighting circuit including a switch SW, rheostat RH, and a battery BAT. The socket member 42 is provided with an enlarged end portion circumferentially shielding the bulb portion of the electric lamp. A sheet metal clip member 48 has an opening 50 tightly embracing the enlarged portion of the tubular socket member 42 to form a rigid connection therewith and is provided with two spaced parallel portions 52 which are provided with reverse-bend spring tabs 54 for wedgeably mounting the light assembly 40 within the groove 36 formed between the instrument panel and the supporting frame.

By means of the above-described construction, when the cover member 18 is in its closed position, the light from the shielded light L-6 as controlled by the rheostat RH and the switch SW will leak through the peripheral clearance provided between the cover member and the opening 12 to provide a soft indirect light outlining the ash tray cover member 18. When the cover member is opened to its intermediate position with the combined snuffer and stop member 32 in abutment with the pad 34, as shown in Figure 3, the rays of the shielded light L-6 are directed downwardly onto the back surface portion 33 of the snuffer-stop member 32 which shades or prevents any substantial amounts of direct illumination of the interior of the ash receptacle which would be detrimental to the night vision of the vehicle occupants. Thus, it will be seen that the member 32, in combination with the frame member 16, forms a shield or shade for causing the indirect illumination of the receptacle when it is moved to its opened position.

It is to be understood that variations for accomplishing the desired objects of this invention might be employed and that it is not to be limited to the above-described embodiment. Various changes and modifications, therefore, may be made without sacrificing any of the material advantages of the invention or departing from the scope of the invention as defined in the following claims.

I claim:

1. In a motor vehicle including a panel member having an opening provided therein, an ash tray construction mounted in said opening comprising, in combination, a door, support means secured to said panel member and pivotally mounting said door withing said opening for movement between an open and a closed position, said opening and said door being dimensioned to provide a narrow clearance therebetween when said door is in its closed position, an ash receptacle secured to said door, stop means including a member carried by said receptacle and adapted to abut said panel member to limit the movement of said receptacle and said door in an opening direction, lamp means including a light bulb mounted above said receptacle, circuit means associated with said lamp means and selectively operable to energize said light bulb irrespective of the position of said door and receptacle whereby the peripheral dimension of said door may be selectively outlined by the light from said lamp when said door is in its closed position, and said stop member including a shade portion movable with said receptacle to a position beneath said lamp means thereby preventing the direct illumination of said receptacle when said receptacle and said door are moved in an opening direction.

2. In a motor vehicle including a panel member having an opening provided therein, an ash tray construction mounted in said opening comprising, in combination, an ash receptacle, a support member secured to said panel member and pivotally mounting said ash receptacle within said opening for movement between an open and a closed position, said opening and said receptacle being dimensioned to provide a narrow clearance therebetween what said receptacle is in a closed position, stop means for limiting the movement of said receptacle between its open and closed positions and including a stop member carried by said receptacle, lamp means including a light bulb mounted behind said panel member and above said receptacle and circuit means selectively operable to energize said light bulb irrespective of the position of said receptacle whereby the peripheral dimension of said receptacle may be selectively outlined by light from said light bulb when said receptacle is in its closed position, and said stop member including a shade portion movable with said receptacle to a position below said lamp means thereby preventing the direct illumination of said receptacle by said light bulb when said receptacle is in its open position.

3. An ash tray construction comprising, in combination, a panel member having an opening provided therein, a cover member forming a closure for said opening having a peripheral clearance therewith, support means pivotally mounting said cover member within said opening, an ash receptacle secured to said cover member, stop means on said receptacle for limiting the movement of said receptacle and said cover member between an open and a closed position, lamp means including a light bulb mounted behind said panel member and above said receptacle and circuit means selectively operable to energize said light bulb irrespective of the movement of said cover member and said ash receptacle whereby the periphery of said opening may be selectively illuminated when said receptacle is in its closed position, and said receptacle having a shade portion thereon movable to a position below said lamp means and cooperating with said lamp means to effect indirect illumination of said receptacle when said receptacle is in its open position.

4. An ash tray construction comprising, in combination, support means including a panel member having an opening provided therein, an ash receptacle mounted in said opening and movable between an open and a closed position, said opening in said panel member and said ash receptacle defining a peripheral clearance therebetween when said ash receptacle is in its closed position, lamp means including a light bulb mounted behind said panel member and above said receptacle and an electrical circuit means selectively energizable to light said bulb irrespective of the movement of said receptacle whereby the peripheral clearance between said opening and said receptacle may be selectively outlined by the light from said lamp when said receptacle is in its closed position, and said receptacle having a shade portion movable with said receptacle to a position below said lamp means and cooperating with said lamp means to effect the indirect illumination of said receptacle by said light bulb when said receptacle is moved to its open position.

5. An ash tray construction comprising, in combination, a stationary housing member having an opening provided therein, a cover member for said opening, means for pivotally mounting said cover member within said opening between a closed position and an open position, said opening and said cover member defining a peripheral clearance therebetween when said cover member is in its closed position, spring means intermediate said housing and cover members for maintaining said cover member in either of said positions, an ash receptacle removably mounted on said cover member, stop means including a member carried by said receptacle and adapted upon movement of said cover member and said receptacle in an opening direction to about said housing member thereby limiting opening movement of said cover member and said receptacle to a position intermediate said first-mentioned positions, an illuminating lamp mounted above said receptacle, and a lighting circuit including said lamp and selectively energizable to light said lamp irrespective of the movement of said cover member and said receptacle whereby the outline of said cover member may be selectively illuminated when said cover member is in its closed position, and said stop member having a shade portion for said lamp and movable with said receptacle to a position below said lamp when said cover and receptacle are moved to said intermediate position whereby said receptacle will be principally illuminated by indirect light from said lamp when said cover member and said receptacle are moved to said intermediate position.

References Cited in the file of this patent
UNITED STATES PATENTS

| | | |
|---|---|---|
| 2,119,267 | Coleman | May 31, 1938 |
| 2,277,468 | Welch | Mar. 24, 1942 |
| 2,352,493 | Palmer | June 27, 1944 |
| 2,536,710 | Baker | Jan. 2, 1951 |
| 2,555,716 | Todhunter | June 5, 1951 |
| 2,636,069 | Gilbert | Apr. 21, 1953 |
| 2,702,339 | Beubien | Feb. 15, 1955 |

UNITED STATES PATENT OFFICE

CERTIFICATE OF CORRECTION

Patent No. 2,851,585                                                September 9, 1958

Chester J. Glowzinski

It is hereby certified that error appears in the printed specification of the above numbered patent requiring correction and that the said Letters Patent should read as corrected below.

Column 3, line 11, for "withing" read -- within --; line 39, for "what" read -- when --; column 4, line 39, for "about" read -- abut --.

Signed and sealed this 13th day of January 1959.

(SEAL)
Attest:
KARL H. AXLINE
Attesting Officer

ROBERT C. WATSON
Commissioner of Patents